United States Patent
Gattis et al.

(10) Patent No.: US 9,945,957 B2
(45) Date of Patent: Apr. 17, 2018

(54) MACHINE CONTROL SYSTEM AND METHOD

(71) Applicant: AgJunction LLC, Hiawatha, KS (US)

(72) Inventors: Joshua M. Gattis, Robinson, KS (US); Steven A. Koch, Centralia, KS (US); Mark W. Anderson, Hiawatha, KS (US)

(73) Assignee: AGJUNCTION LLC, Hiawatha, KS (US)

( * ) Notice: Subject to any disclaimer, the term of this patent is extended or adjusted under 35 U.S.C. 154(b) by 0 days.

(21) Appl. No.: 15/083,747

(22) Filed: Mar. 29, 2016

(65) Prior Publication Data

US 2016/0205864 A1    Jul. 21, 2016

Related U.S. Application Data

(63) Continuation-in-part of application No. 14/214,215, filed on Mar. 14, 2014.
(Continued)

(51) Int. Cl.
*G01S 19/14* (2010.01)
*A01M 7/00* (2006.01)
(Continued)

(52) U.S. Cl.
CPC ............ *G01S 19/14* (2013.01); *A01C 23/008* (2013.01); *A01M 7/0057* (2013.01); *A01M 9/0076* (2013.01)

(58) Field of Classification Search
CPC ... A01M 9/0076; A01M 7/0057; G01S 19/14; A01C 23/008
See application file for complete search history.

(56) References Cited

U.S. PATENT DOCUMENTS

| 5,050,771 A | 9/1991 | Hanson |
| 5,194,851 A | 3/1993 | Kraning et al. |

(Continued)

FOREIGN PATENT DOCUMENTS

| AU | 2002244539 | 10/2002 |
| AU | 2002325645 | 3/2003 |

(Continued)

OTHER PUBLICATIONS

International Search Report and Written Opinion for PCT/US2015/020799 dated Jun. 25, 2015.
(Continued)

*Primary Examiner* — Rodney A Butler
(74) *Attorney, Agent, or Firm* — Schwabe Williamson & Wyatt

(57) ABSTRACT

A global navigation satellite system (GNSS) based control system is provided for positioning a working component relative to a work surface, such as an agricultural spray boom over a crop field. Inertial measurement unit (IMU) sensors, such as accelerometers and gyroscopes, are mounted on the working component and provide positioning signals to a control processor. A method of positioning a working component relative to a work surface using GNSS-based positioning signals is also disclosed. Further disclosed is a work order management system and method, which can be configured for controlling the operation of multiple vehicles, such as agricultural sprayers each equipped with GNSS-based spray boom height control subsystems. The sprayers can be remotely located from each other on multiple crop fields, and can utilize GNSS-based, field-specific terrain models for controlling their spraying operations.

17 Claims, 1 Drawing Sheet

Related U.S. Application Data

(60) Provisional application No. 61/783,973, filed on Mar. 14, 2013.

(51) Int. Cl.
  *A01M 9/00* (2006.01)
  *A01C 23/00* (2006.01)

(56) References Cited

U.S. PATENT DOCUMENTS

| | | | |
|---|---|---|---|
| 5,348,226 A | 9/1994 | Heiniger | |
| 5,390,125 A | 2/1995 | Sennott et al. | |
| 5,663,879 A | 9/1997 | Trovato et al. | |
| 5,684,476 A | 11/1997 | Anderson | |
| 5,923,270 A | 7/1999 | Sampo et al. | |
| 6,052,647 A | 4/2000 | Parkinson et al. | |
| 6,070,673 A | 6/2000 | Wendte | |
| 6,073,070 A | 6/2000 | Diekhans | |
| 6,212,453 B1 | 4/2001 | Kawagoe et al. | |
| 6,377,889 B1 | 4/2002 | Soest | |
| 6,445,983 B1 | 9/2002 | Dickson et al. | |
| 6,539,303 B2 | 3/2003 | McClure | |
| 6,711,501 B2 | 3/2004 | McClure | |
| 6,789,014 B1 | 9/2004 | Rekow et al. | |
| 6,804,587 B1 | 10/2004 | O'Connor | |
| 6,819,780 B2 | 11/2004 | Benson et al. | |
| 6,865,465 B2 | 3/2005 | McClure | |
| 6,876,920 B1 | 4/2005 | Mailer | |
| 7,142,956 B2 | 11/2006 | Heiniger et al. | |
| 7,277,792 B2 | 10/2007 | Overschie | |
| 7,437,230 B2 | 10/2008 | McClure | |
| 7,460,942 B2 | 12/2008 | Mailer | |
| 7,623,952 B2 | 11/2009 | Unruh | |
| 7,650,252 B2 | 1/2010 | McClure | |
| 7,689,354 B2 | 3/2010 | Heiniger | |
| RE41,358 E | 5/2010 | Heiniger | |
| 7,860,628 B2 | 12/2010 | Lange | |
| 8,140,223 B2 | 3/2012 | Whitehead | |
| 8,190,337 B2 | 5/2012 | McClure | |
| 8,214,111 B2 | 7/2012 | Heiniger | |
| 8,265,826 B2 | 9/2012 | Feller | |
| 8,386,129 B2 | 2/2013 | Collins | |
| 8,437,901 B2 | 5/2013 | Anderson | |
| 8,548,649 B2 | 10/2013 | Guyette | |
| 8,583,315 B2 | 11/2013 | Whitehead | |
| 8,583,326 B2 | 11/2013 | Collins | |
| 8,594,879 B2 | 11/2013 | Roberge | |
| 8,634,993 B2 | 1/2014 | McClure | |
| 8,649,930 B2 | 2/2014 | Reeve et al. | |
| 9,002,565 B2 | 4/2015 | Jones | |
| 2002/0049538 A1 | 4/2002 | Knapton | |
| 2002/0072850 A1 | 6/2002 | McClure et al. | |
| 2004/0186644 A1 | 9/2004 | McClure et al. | |
| 2006/0167600 A1 | 7/2006 | Nelson, Jr. et al. | |
| 2008/0195268 A1 | 8/2008 | Sapilewski | |
| 2009/0099737 A1 | 4/2009 | Wendte | |
| 2009/0121932 A1 | 5/2009 | Whitehead | |
| 2009/0164067 A1 | 6/2009 | Whitehead | |
| 2009/0251366 A1* | 10/2009 | McClure | G01C 21/00 342/357.31 |
| 2009/0312974 A1 | 12/2009 | Douglas | |
| 2010/0312428 A1 | 12/2010 | Roberge | |
| 2011/0015817 A1 | 1/2011 | Reeve | |
| 2011/0018765 A1 | 1/2011 | Whitehead | |
| 2011/0054729 A1 | 3/2011 | Whitehead | |
| 2011/0224873 A1* | 9/2011 | Reeve | A01B 79/005 701/41 |
| 2011/0231061 A1 | 9/2011 | Reeve | |
| 2011/0266365 A1 | 11/2011 | Hrnicek | |
| 2012/0087771 A1* | 4/2012 | Wenzel | A01F 12/60 414/808 |
| 2012/0130593 A1 | 5/2012 | Davis | |
| 2012/0169495 A1 | 7/2012 | Kowalchuk | |
| 2012/0173093 A1 | 7/2012 | Kowalchuk | |
| 2012/0174445 A1 | 7/2012 | Jones | |
| 2012/0215410 A1 | 8/2012 | McClure | |
| 2012/0301220 A1 | 11/2012 | Snoeck et al. | |
| 2013/0008360 A1 | 1/2013 | Follmer | |
| 2013/0179026 A1 | 7/2013 | McClure et al. | |
| 2013/0311050 A1* | 11/2013 | Cash | A01C 21/00 701/50 |
| 2013/0345937 A1* | 12/2013 | Strelioff | A01M 7/0057 701/50 |
| 2014/0074360 A1 | 3/2014 | Rosa et al. | |
| 2014/0093397 A1* | 4/2014 | Engelbrecht | A01M 7/0089 417/46 |
| 2014/0168009 A1 | 6/2014 | Peake | |
| 2014/0277676 A1 | 9/2014 | Gattis | |

FOREIGN PATENT DOCUMENTS

| | | |
|---|---|---|
| AU | 2008080193 | 7/2008 |
| WO | 2010/005945 | 1/2010 |
| WO | 2012/146255 A1 | 11/2012 |

OTHER PUBLICATIONS

Noh, Kwang-Mo, Self-tuning controller for farm tractor guidance, Iowa State University Retrospective Theses and Dissertations, Paper 9874, (1990).

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

* cited by examiner

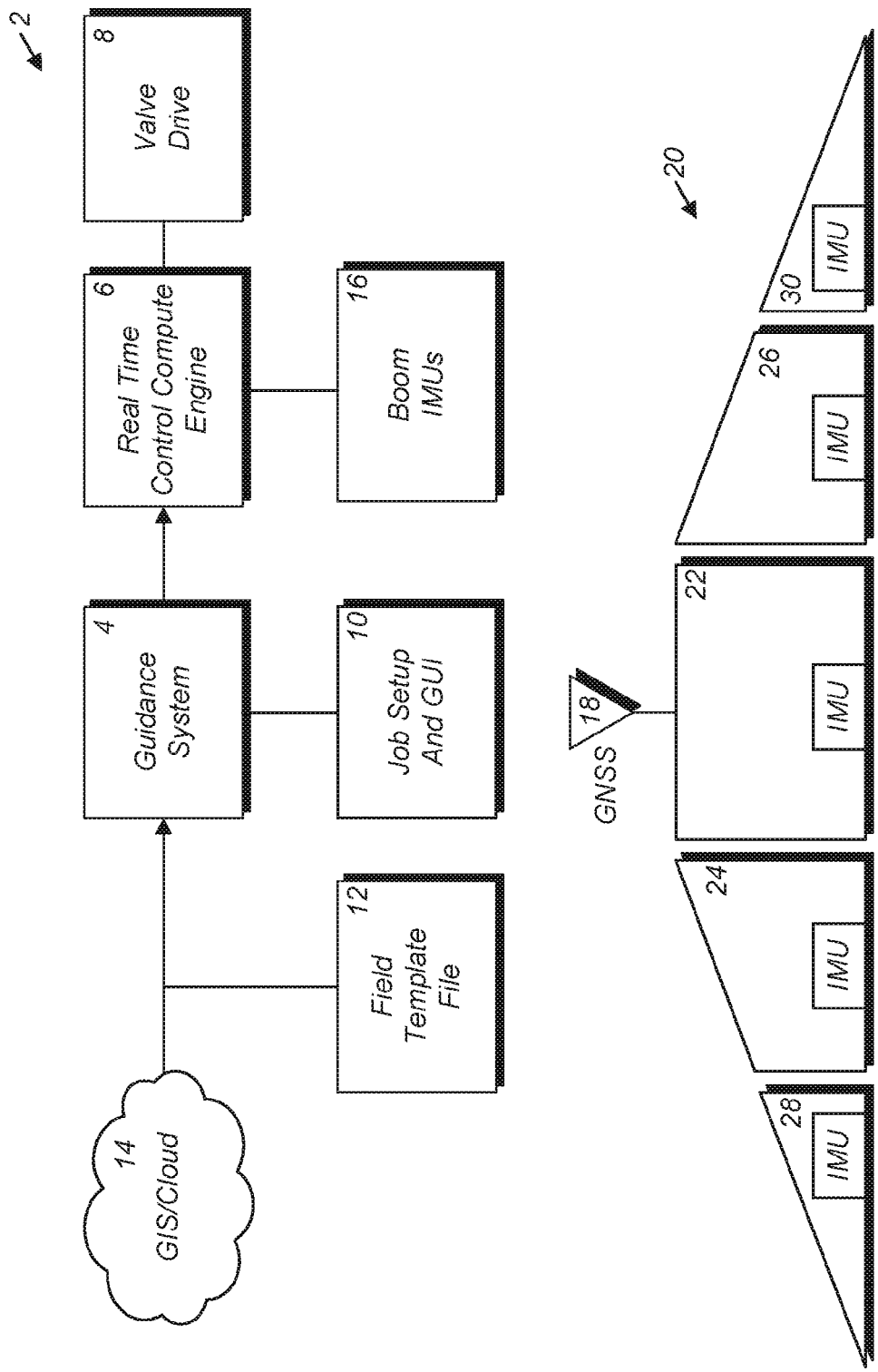

MACHINE CONTROL SYSTEM AND METHOD

CROSS-REFERENCE TO RELATED APPLICATION

This application is a continuation-in-part of and claims priority in U.S. patent application Ser. No. 14/214,215, filed Mar. 14, 2014, which claims priority in U.S. Provisional Patent Application No. 61/783,973, filed Mar. 14, 2013, both of which are incorporated herein by reference. U.S. Pat. No. 6,539,303; U.S. Pat. No. 6,711,501; U.S. Pat. No. 8,214,111; U.S. Pat. No. 8,386,129; U.S. Pat. No. 8,548,649; U.S. Pat. No. 8,583,315; U.S. Pat. No. 8,583,326; and U.S. Pat. No. 8,594,879 are also incorporated herein by reference.

BACKGROUND OF THE INVENTION

1. Field of the Invention

The present invention relates generally to automated machine control, which can be configured for work order management involving multiple agricultural vehicles and crop fields, and in particular to a global navigation satellite system (GNSS) based agricultural spray boom height control system and method.

2. Description of the Related Art

Mobile equipment and machinery, including vehicles, agricultural equipment, open-pit mining machines and crop duster aircraft, are commonly guided and operationally controlled using global navigation satellite system (GNSS) components. Currently-available satellite positioning systems (SATPS) provide parallel and contour swathing for precision farming. For example, equipment can be guided or automatically steered along adjacent parallel path swaths, which can be offset from each other by approximately the vehicle width in a parallel path mode of operation.

Various GNSS-based navigation systems have been installed in ground-based vehicles. Systems using Doppler radar guidance systems can encounter positioning errors with the radar and latency. Similarly, gyroscopes and accelerometers (collectively inertial measurement units (IMUs)) provide heading, roll and pitch measurements (e.g., XYZ headings). However, IMUs tend to encounter drift and bias errors requiring external attitude measurements for gyroscope initialization and drift compensation. Gyroscopes have good short-term characteristics but undesirable long-term characteristics, especially lower-cost gyroscopes, such as those based on vibrating resonators.

Similarly, inertial systems employing gyroscopes and accelerometers have good short-term characteristics but also suffer from drift. Existing GNSS position computations may include lag times, which may be especially troublesome when, for example, GNSS velocity is used to derive vehicle heading. Many existing GNSS systems do not provide highly accurate heading information at slower vehicle speeds. Therefore, what is needed is a low cost sensor system to facilitate vehicle swath navigation that makes use of the desirable behaviors of both GNSS and inertial units while eliminating or reducing non-desirable behavior. Specifically, what is needed is a means to employ low-cost gyroscopes (e.g., micro electromechanical (MEM) gyroscopes) which tend to provide good short-term, low-noise, high-accuracy positioning while minimizing inherent long-term drift.

Providing multiple antennas on a vehicle can provide additional benefits by determining an attitude of the vehicle from the GNSS ranging signals received by its antennas, which are constrained on the vehicle at a predetermined spacing. For example, high dynamic roll compensation signals can be output directly to the vehicle steering using GNSS-derived attitude information. Components such as gyroscopes and accelerometers can be eliminated using such techniques. Real-time kinematic (RTK) navigation can be accomplished using relatively economical single frequency L1—only receivers with inputs from at least two antennas mounted in fixed relation on a rover vehicle. Still further, moving baselines can be provided for positioning solutions involving tractors and implements and multi-vehicle GNSS control can be provided.

Providing additional antennas in combination with standard SATPS and GNSS guidance, as mentioned above, along with optional gyroscopes, can provide an effective method to increase GNSS positioning precision and accuracy. However, accuracy and precision can only improve the efficiency of working vehicles, such as those in the agricultural field, to a limited extent. Although such systems are able to track and guide vehicles in three dimensions, including along ridges and sloped-regions, errors may appear in other aspects of a working vehicle. For example, in an agricultural field-working situation where a tractor is towing an implement, the implement may slide on a sloped-region, or the tractor may list to one side or another when entering softer soil or rocky areas. This can happen repeatedly when a vehicle is guided around the same field, regardless of the precision of the guidance system in pre-planning a path. Thus, a system that can detect such changes in uniformity of a field as the vehicle traverses a path, and can remember those changes, can predict and re-route a more accurate and more economical path than a guidance system alone.

Conventional agricultural spraying operations are carried out over an entire field, everywhere the crop is planted. In contrast, environmental spraying allows the spraying of certain materials which require restrictions in the area of deposition due to potential toxicity or strength. The restrictions can include the distance from waterways and slope of the ground which can affect run-off and concentrations of deposits. In spray equipment with booms, maintaining uniform boom height over field surfaces during product application is important for uniform application rates and optimum product drift management relative to the targets, e.g., field crops. These systems are limited in performance due to their ability to look ahead and react with a spray vehicle traveling at a high rate of speed. In addition, these methods encounter issues when there are rapid changes in terrain or skips in crop canopy. The present invention addresses both issues.

GNSS-based precision application of agricultural inputs, such as pesticides, fertilizers and seeds, are commonly performed with large fleets of vehicles dispatched from common or networked home-base locations. Communication of mission planning information to all working vehicles, in real time, is paramount to efficiency. One piece of such information, which is a key to the present invention, is the terrain model, which can be created with specialized software using previously-logged field data containing highly precise positioning information from real-time kinematic (RTK) GNSS receivers. The logged data can be uploaded to the processing center from the logging vehicle through any data connection, although a wireless/remote connection is most desired for efficiency. Once processed, the terrain models can be dispatched from the home-base or processing center location to any vehicle via wireless data connection. The data is thus available to operators preparing to work fields using the boom height control system of the present invention. Using wireless data connectivity, the Internet (i.e., via the "Cloud") enables efficient use of a boom height invention via the seamless transfer of the terrain model, which is a key component of the system.

Work order management functions for coordinating multiple machines at multiple remote locations can be accommodated with the present invention.

Previous spray boom height control systems include sonic sensors for measuring spray boom heights over ground surfaces and crop canopies.

Heretofore there has not been available a system and method with the advantages and features of the present invention.

SUMMARY OF THE INVENTION

In the practice of the present invention, position sensors (such as GNSS and IMU) are used to accurately locate the implement (such as a spray boom) with reference to the ground, standing crop, or other field features. Real time compute engine processes control algorithms to compare sensor data with spatial data logged from a previous operation, or terrain model, to make control decisions which maintain desired implement height. Work order management systems and methods can be combined with the machine control functions of the present invention to further automate operations, including agricultural operations involving multiple machines operating at multiple locations and sharing data with each other and with centralized data facilities.

BRIEF DESCRIPTION OF THE DRAWINGS

The drawings constitute a part of this specification and include exemplary embodiments of the present invention illustrating various objects and features thereof.

FIG. 1 is a schematic diagram of a boom height control system embodying an aspect of the present invention.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment

FIG. 1 is a schematic diagram of a boom height control system 2. Without limitation on the generality of useful applications of the present invention, the system 2 is shown for controlling the height of a spray boom 20, which can be used for agricultural applications, such as spraying fertilizer, herbicides, pesticides, water, etc. The control system 2 includes a guidance system 4, which can be global navigation satellite system (GNSS) based. A real-time control compute engine 6 is connected to the guidance system 4 and can be programmed with specific control instructions and applications, including variable-rate (VR), selective control, guidance, auto-steering, etc. A valve drive 8 can be connected to the compute engine 6 for connection to a steering system of a vehicle, such as a tractor or a self-propelled equipment piece.

The guidance system is connected to a job set up and graphical user interface (GUI) component 10, which can include suitable display monitor components. A field template file 12 is provided for specific fields and includes such information as GNSS-defined field coordinates, material prescription information, environmental conditions and equipment routing directions. Geodesic (e.g., geographic) information system (GIS) and cloud (e.g., Internet) 14 data sources and connectivity are provided for communicating bi-directionally with the other components of the system 2.

Boom inertial measurement units 16 are connected to the control compute engine 6, and can include such devices as accelerometers and gyroscopes for measuring inertia and positioning information in three axes (X, Y, Z). The boom 20 can include a GNSS receiver with an antenna 18, or can be directly controlled via the implement motive component, such as a tractor. The boom 20 includes sections 22, 24, 26, 28, 30, each equipped with its own inertial measurement unit (IMU) 16. The boom sections can be articulated for conforming to field conditions.

The system 2 can utilize a terrain model of the field, including field boundaries, topography, soil conditions, crop data and other pertinent information. Moreover, the terrain models can be generated in real-time as the equipment traverses the field, transmitted from the mobile equipment to a centralized server or base, and re-transmitted to the equipment for use in current field operations, which can be done based on work orders. Multiple mobile equipment pieces engaged in multiple different field locations can be controlled and coordinated.

III. Agricultural Spray Boom Height Control Method

Without limitation, the system 2 can be used for practicing a method of the present invention for controlling the height of an agricultural spray boom using the following steps:
1) Field is logged/mapped using highly accurate sensors (such as RTK GNSS) for measurement of field terrain elevations. This may be done as an independent step using an ATV or field truck, or data may be used/collected from another farming operation such as harvesting, which covers the same terrain.
2) Field log data may be stored and processed in an office/cloud GIS and data management toolset. The data element can be transferred from the field to the office and back using a remote data connection networking fleet vehicles with physical dispatch locations.
3) File is loaded in guidance system on target machine (sprayer, for example).
4) User selects the job file in the guidance system which includes the processed elevation data.
5) The user chooses/sets up boom control options to use the field log including desired height above the target.

6) As the system works across the field, sensor data is compared to elevation data and performs real-time control through a mechanical control system (typically electro-hydraulic or mechanical in nature).

IV. Alternative Embodiment Agricultural Spray Boom Height Control

The system 2 can also be used in conjunction with a work order management system for controlling multiple pieces of equipment (e.g., without limitation, agricultural vehicles equipped with spray booms 20). Work order status including location, equipment status and field conditions can be transmitted via the cloud 14 to a central location equipped with a computer for coordinating the operation of a fleet of agricultural vehicles. A variety of user interface devices, including vehicle-mounted computers, smart phones, handheld devices, etc. can be utilized. Data can be transmitted to and from the vehicles in real-time. Alternatively, data can be stored for later retrieval and processing (e.g., on removable storage media such as USB thumb drives, CDs, DVDs, etc.). These can be periodically downloaded and data thereon transferred to a central control computer or system.

Such data can include, without limitation, field terrain models as described above. Other data can comprise, for example, work orders, crop data, agricultural input (e.g., fertilizers, herbicides, seeds, nutrients, etc.) and machine-specific performance and location information. The system is scalable for accommodating multiple fields and fleets of vehicles, which can be located in proximity to, or remote from, each other. By interconnecting the vehicles via the cloud, specific operations (e.g., spray boom heights, spray materials and field conditions), can be recorded for reporting, monitoring, evaluating, tracking and controlling operations.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A system for controlling the position of a working component relative to a work surface, wherein the working component comprises an agricultural boom for a farm implement pulled by a vehicle and the work surface comprises a field, the system comprising:
   a control system located on the vehicle, the control system including a hardware processor to:
   receive sensor data from sensors, the sensor data including inertial information from one or more inertial measurement units (IMU) mounted on the working component and position data from a global navigation satellite system (GNSS) located on the vehicle;
   store the sensor data in a memory device;
   download via an Internet connection from a central server a terrain model previously logged by the same or a different vehicle during a previous vehicle operation;
   compare the sensor data with the terrain model;
   adjust a position the working component relative to the work surface based on the comparison of the sensor data with the terrain model; and
   send the inertial information from the IMU and the position data from the GNSS back to the central server for distributing to different vehicles.

2. The system according to claim 1 wherein the inertial measurement units (IMU) are mounted on different sections of the agricultural boom.

3. The system according to claim 1, wherein the working component comprises an agricultural sprayer including a spray boom.

4. The system according claim 2 wherein the processor independently controls heights of the different sections of the agricultural boom over the field based on the comparison of the sensor data with the terrain model.

5. The system according to claim 1, wherein the terrain model includes boundaries of the field, a topography of the field, and soil conditions of the field.

6. The system according to claim 1, wherein the processor monitors, stores, and reports operation data for the vehicle to the central server.

7. The system according to claim 6 wherein the operation data includes quantities of material dispensed by agricultural sprayers located on the agricultural boom.

8. The system according to claim 7 wherein the operation data includes locations of the material dispensed by the agricultural sprayers.

9. A control system for controlling the position of a working component relative to a work surface, the working component being a farm implement attached to a vehicle and the work surface being a field, the control system comprising:
   a global navigation satellite system (GNSS) to provide GNSS coordinates;
   an inertial measurement unit (IMU) sensor mounted on the working component to provide inertia information;
   one or more sensors associated with the working component and each configured to provide signal data corresponding to an operating or status condition of the working component; and
   a computer to:
   store field data in computer memory including the GNSS coordinates from the GNSS, the inertia information from the IMU sensor, and the signal data from the one or more sensors associated with the working component,
   create a terrain model from the field data, and
   send the terrain model to a central control computer for distributing to another vehicle for controlling an associated farm implement.

10. The system according to claim 9, the computer further to:
    receive user inputs associated with the stored field data;
    create a work order based on the user inputs and the field data; and
    send the work order to the central control computer for distributing to the other vehicle to control the associated farm implement and compete the work order.

11. The system according to claim 9, further comprising a wireless interface coupled to the computer for connecting to the central control computer.

12. The system according to claim 9, wherein the field data includes field boundaries, field topography, and soil conditions.

13. The system according to claim 9, wherein the computer comprises at least one of an equipment-mounted virtual terminal, a laptop computer, a tablet computer, a smart phone, a desktop computer, and a netbook.

14. A method of controlling the position of a working component relative to a work surface, the working component including a boom coupled to a vehicle and the work surface comprising a field, the method comprising:
    downloading, by a computer operating on the vehicle, a field terrain model from a central server, the field terrain model including terrain elevations for the field;

receiving, by the computer, inertial data from an inertial measurement unit (IMU) mounted on the working component, the inertial data identifying inertial movements of the working component;

receiving, by the computer, position data from a global navigation satellite system (GNSS) located on the vehicle;

comparing, by the computer, the position data from the GNSS and the inertial data from the IMU with the field terrain model;

positioning, by the computer, the working component relative to the work surface based on the comparison of the position data and the inertial data with the field terrain model; and coordinating the operations of multiple farm implements located on different farm vehicles remotely from each other via the central server and reporting the operations back to the central server.

15. A method of controlling the position of a working component relative to a work surface, the working component including a boom coupled to a vehicle and the work surface comprising a field, the method comprising:

downloading, by a computer operating on the vehicle, a field terrain model from a central server, the field terrain model including terrain elevations for the field;

receiving, by the computer, inertial data from an inertial measurement unit (IMU) mounted on the working component, the inertial data identifying inertial movements of the working component;

receiving, by the computer, position data from a global navigation satellite system (GNSS) located on the vehicle;

comparing, by the computer, the position data from the GNSS and the inertial data from the IMU with the field terrain model;

positioning, by the computer, the working component relative to the work surface based on the comparison of the position data and the inertial data with the field terrain model; and sending, by the computer, the position data from the GNSS and the inertial data from the IMU back to the central server for distributing to different vehicles.

16. The method according to claim 14, further comprising downloading, by the computer, the field terrain model via the Internet.

17. The method according to claim 14, wherein the working component comprises an agricultural spray boom and the inertial data and position data identify spray boom heights for different sections of the spray boom above the work surface.

* * * * *